(12) United States Patent  
Deeks et al.

(10) Patent No.: US 9,908,513 B2  
(45) Date of Patent: Mar. 6, 2018

(54) VEHICLE COOLING SYSTEM

(71) Applicant: JAGUAR LAND ROVER LIMITED, Warwickshire (GB)

(72) Inventors: Andrew Deeks, Coventry (GB); Matt Cobain, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/101,961

(22) PCT Filed: Nov. 6, 2014

(86) PCT No.: PCT/EP2014/073935  
§ 371 (c)(1),  
(2) Date: Jun. 6, 2016

(87) PCT Pub. No.: WO2015/082170  
PCT Pub. Date: Jun. 11, 2015

(65) Prior Publication Data  
US 2016/0311406 A1 Oct. 27, 2016

(30) Foreign Application Priority Data

Dec. 6, 2013 (GB) .................................. 1321561.1

(51) Int. Cl.  
*B60S 1/64* (2006.01)  
*B60K 11/06* (2006.01)  
(Continued)

(52) U.S. Cl.  
CPC .............. *B60S 1/64* (2013.01); *B60F 3/0053* (2013.01); *B60K 11/06* (2013.01); *F01P 5/043* (2013.01)

(58) Field of Classification Search  
CPC .......... B60S 1/64; B60F 3/0053; B60K 11/06; F01P 5/043  
(Continued)

(56) References Cited

U.S. PATENT DOCUMENTS 5,496,154 A * 3/1996 Hall, III .................. F16D 25/02  
192/105 B  
6,750,623 B1 * 6/2004 McCauley .............. F01P 7/044  
318/260

(Continued)

FOREIGN PATENT DOCUMENTS

EP 0875631 A1 11/1998  
EP 2390423 A2 11/2011  
(Continued)

OTHER PUBLICATIONS

Combined Search and Examination Report under Sections 17 and 18(3) for Application No. GB1321561.1 dated Jul. 9, 2014.

(Continued)

*Primary Examiner* — Marthe Y Marc-Coleman  
(74) *Attorney, Agent, or Firm* — Carlson, Gasky & Olds, P.C.

(57) ABSTRACT

Aspects of the present invention relate to a vehicle control system, a vehicle, a method and a program configured to, in response to a signal indicative that at least the front of the vehicle is no longer substantially submerged in water, to operate a vehicle cooling fan in a reverse direction, optionally for a predetermined time period. The system may include sensors that determine the water level about the vehicle and automatically operate a vehicle cooling fan in a reverse direction based on said determined water level.

15 Claims, 3 Drawing Sheets

(51) Int. Cl.
*F01P 5/04* (2006.01)
*B60F 3/00* (2006.01)

(58) Field of Classification Search
USPC .................... 701/36; 123/41.11; 180/68.1
See application file for complete search history.

(56) References Cited

U.S. PATENT DOCUMENTS

| | | |
|---|---|---|
| 2004/0113573 A1 | 6/2004 | McCauley et al. |
| 2008/0136357 A1 | 6/2008 | Beck et al. |
| 2009/0159020 A1 | 6/2009 | Hall et al. |
| 2012/0304944 A1* | 12/2012 | Nelson .................... F01P 11/06 123/41.12 |

FOREIGN PATENT DOCUMENTS

| | | |
|---|---|---|
| GB | 2489109 A | 9/2012 |
| NO | 2012/166881 A2 | 12/2012 |

OTHER PUBLICATIONS

International Search Report and Written Opinion of the International Searching Authority for International application No. PCT/EP20144/073935 dated Jan. 16, 2015.

* cited by examiner

VEHICLE COOLING SYSTEM

TECHNICAL FIELD

The present invention relates to improvements in cooling systems used in land vehicles, in particular to a controller for a vehicle, a vehicle control system, a vehicle, a method of controlling a vehicle and a program for controlling a vehicle.

BACKGROUND OF THE INVENTION

It is known to provide a water cooling system for a vehicle that circulates water through and around an engine to extract heat therefrom, and an air cooled radiator positioned towards the font of the vehicle such that air is passed thereover when the vehicle is moving. It is also well established in the prior art to place cooling fans adjacent the radiator such that when the vehicle is not moving, or when the vehicle is not moving fast enough for an airflow over the radiator to sufficiently cool the radiator, the fans may be operated to force air over the radiator so as to effect the necessary cooling.

It is also known to provide land vehicles that are capable of wading through water. It is also known that when wading through water it may in some circumstances be preferable for cooling fans not to be rotating when immersed or partially immersed in water so as to prevent them from to throwing water around the engine compartment.

Often the water that vehicles wade in may contain contaminants, for example it may contain mud, sand or silt. Further it is not uncommon for water through which vehicles are wading to contain debris, for example leaves. Once the vehicle exits water the contaminants can be lodged or dry into the radiator, over time reducing its efficiency.

It is an aim of the present invention to improve known vehicle cooling systems.

SUMMARY OF THE INVENTION

Aspects of the present invention relate to a vehicle control system; a method of controlling a cooling fan of a land vehicle; and an electronic controller.

According to an aspect of the present invention, for which protection is sought, there is provided a vehicle control system for a land vehicle, the system configured to, in response to a signal indicative that at least the front of the vehicle is no longer substantially submerged in water, to operate a vehicle cooling fan in a reverse direction.

In an embodiment, the system comprises an electronic processor having an electrical input for receiving one or more electrical signals indicative that at least the front of the vehicle is no longer substantially submerged in water; and an electronic memory device electrically coupled to the electronic processor and having instructions stored therein, wherein the processor is configured to access the memory device and execute the instructions stored therein such that it is operable to, in response to said signal indicating that at least the front of the vehicle is no longer substantially submerged in water, operate a vehicle cooling fan in a reverse direction.

Optionally the signal indicative that at least the front of the vehicle is no longer substantially submerged in water comprises a signal indicative that a water level relative to the vehicle has fallen below a first threshold value.

By running the cooling fan in reverse for a short time after the vehicle emerges from water, any contaminants, including water containing silt, mud, or the like, that have become lodged in the front of, or have entered between fins of the radiator as water passed over it during wading can be blown out prior to heat from the radiator evaporating any water content to leave a residue on the radiator.

In one arrangement the vehicle control system further comprises a driver actuable input means for creating a signal indicative that least the front of the vehicle is no longer substantially submerged in water. In this manner, if the driver identifies that the vehicle has emerged from water they can input a command via the driver actuable input means to operate the fan in reverse. The driver actuable input means may for example comprise a dedicated hard or electronic switch (e.g. touch screen switch) or a menu selectable option via a human machine interface (HMI).

The vehicle control system may further comprise a sensing means, for example a contact or remote sensor, for sensing a water level about the vehicle and outputting said signal indicative that at least the front of the vehicle is no longer substantially submerged in water in response to said sensed water level falling below a threshold value. In one arrangement the vehicle control system may further comprising a control means, which may comprise controller, said sensing means may comprises a water level sensor and a wading controller module, and the wading control module may determine if the sensed water level falls below said first threshold value, and in response thereto creates said signal indicative that at least the front of the vehicle is no longer substantially submerged in water. In another, alternative, arrangement the vehicle control system may further comprise a control means, said sensing means may comprises a water level sensor and a wading control module, and the wading controller may be configured to determine the depth of water about the vehicle and output a signal indicative of said depth, and said control means compares said determined depth of water to said first threshold depth and controls said fan in dependence upon said comparison. Optionally the sensing means may be configured to determine a water level at the front of said vehicle.

The system may be configured to, in response to receipt of said signal that at least the front of the vehicle is no longer substantially submerged in water, operate said cooling fan in reverse for a predetermined period of time.

By operating in reverse for a predetermined period a balance between cleaning the radiator and effective cooling can be reached. When the fan is running in reverse it is likely that the cooling effect of the radiator will be reduced, hence it may be beneficial to limit the time period in which the fan is run in reverse so as to have an effective cleaning of the radiator without compromising engine temperature. The reverse operation could, for example, be in the region of 5 to 60 seconds. Following the predetermined period of time the system will operate said fan in a forward direction to resume normal cooling, if necessary. It will be appreciated that operation of the cooling fan need not be continuous and the fan may only be operated if the temperature of coolant circulating through the radiator exceeds a predetermined temperature.

In one arrangement operating said fan in a reverse direction may comprises controlling the fan to operate at a speed above its peak efficiency speed. Although fan motors can generally operate at different speeds, the design of each motor will have to a speed at which their efficiency is maximised, and will usually be operated at this speed. Continuous operation above this speed can result in increased wear and reduced life of the fan, however temporarily exceeding this is acceptable. As the fan blades will be designed to maximise air flow when operated in their forward direction, they will produce a reduced airflow in a reverse direction when operated at the same speed, and accordingly increasing the speed when operating in reverse for a short time period will increase the airflow produced for cleaning the radiator.

The vehicle control system may be configured to determine when the vehicle is in, or is about to enter into, water at a second threshold depth at which cooling fan operation is effected by said water, and to suspend cooling fan operation in response thereto. The first threshold depth and the second threshold depth may be the same.

In one embodiment the vehicle control system is for a vehicle having closable vanes for closing an airflow path between a front air inlet of the vehicle and an engine compartment thereof, the system being configured to open said closable vanes when said fan is run in reverse. The system may output an electrical control signal to operate said closable vanes to place them in an open position.

According to another aspect of the present invention, for which protection is sought, there is provided a vehicle comprising a vehicle control system according to any one of the above paragraphs.

In one arrangement the vehicle may comprise a radiator disposed substantially at a front end thereof, an engine disposed inwardly of said radiator, and a fan disposed between said engine and said radiator, wherein said fan is oriented such that it is operable in a forward direction to draw air over said radiator towards said engine and in a reverse direction to expel air away from said engine through said radiator.

The vehicle may comprise one or more closable vanes located between a front grill thereof and the radiator, the closable vanes movable between an open condition in which a flow path is open between the grill and the radiator, and a closed position in which the flow path between the grill and the radiator is substantially closed. The control system may be configured to open said closable vanes when said fan is run in reverse. In this manner the vanes may be closed when the vehicle is wading to minimise the passage water into the radiator and may be opened when the vehicle emerges from the water to allow the fan, when being run in reverse, to expel air through the radiator, open vanes, and front grill.

The vehicle may further comprising at least one water level sensor mounted thereon.

According to another aspect of the present invention, for which protection is sought, there is provided a method of controlling a cooling fan of a land vehicle, the method comprising: in response to a signal indicative that at least the front of the vehicle is no longer substantially submerged in water, operating a vehicle cooling fan in a reverse direction.

The signal indicative that at least the front of the vehicle is no longer substantially submerged in water may comprise a signal indicative that a water level relative to the vehicle has fallen below a first threshold value.

In one embodiment the method may further comprise providing a driver actuable input means for creating a signal indicative that at least the front of the vehicle is no longer substantially submerged in water.

The method may comprising sensing a water level about the vehicle and outputting said signal indicative that at least the front of the vehicle is no longer substantially submerged in water in response to said sensed water level falling below a threshold value.

The method may comprise providing a water sensing means to determine the depth of water about the vehicle. Optionally the sensing means may determine a water level at the front of said vehicle.

In response to receipt of said signal that at least the front of the vehicle is no longer substantially submerged in water, the method may comprise operating said cooling fan in reverse for a predetermined period of time. Following said predetermined period of time, the method may operating said fan in a forward direction, or may stop control of the fan in either direction.

Optionally, operating said fan in a reverse direction may comprise operating said fan at a speed above its peak efficiency speed.

The method may further comprising determining when the vehicle is in, or is about to enter into, water at a second threshold depth at which cooling fan operation is effected by said water, and suspending cooling fan operation in response thereto. The first threshold depth and the second threshold depth may be the same.

According to another aspect of the present invention, for which protection is sought, there is provided an electronic controller configured to, or programmed to, perform the method as described above.

According to a further aspect of the invention for which protection is sought, there is provided a non-transitory, computer-readable storage medium storing instructions thereon that when executed by one or more electronic processors causes the one or more processors to carry out the method described herein.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
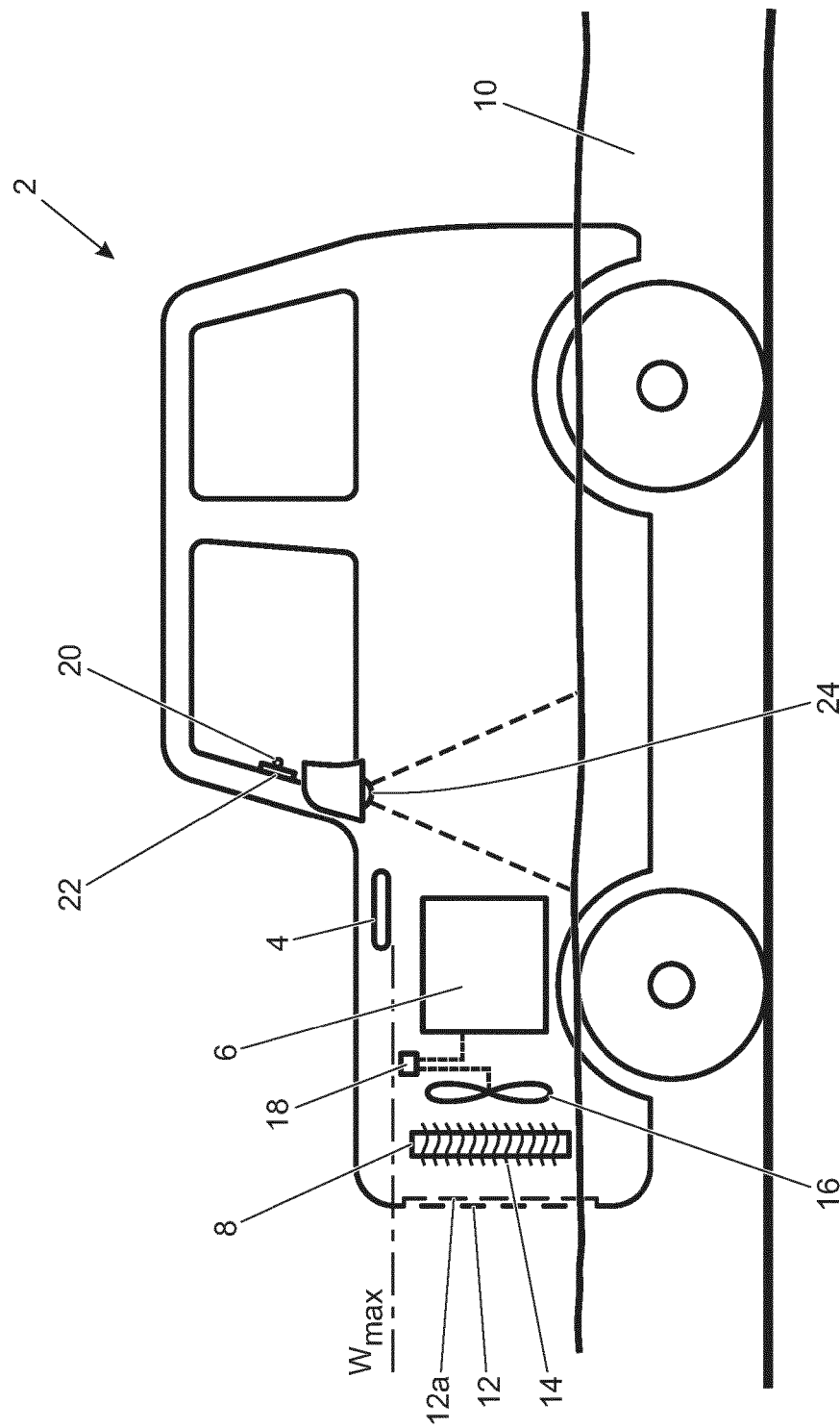
FIG. 1 shows a schematic representation of a vehicle of the invention.
Figure 2:
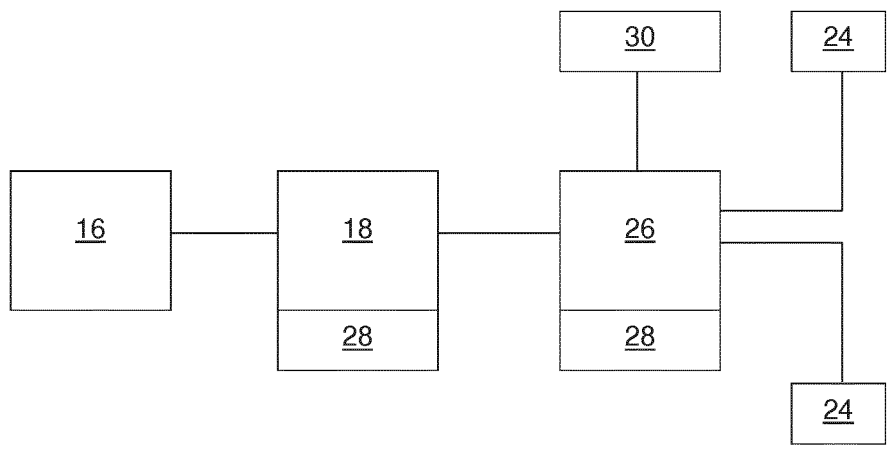
FIG. 2 shows a block diagram illustrating the control system of the invention.
Figure 3:
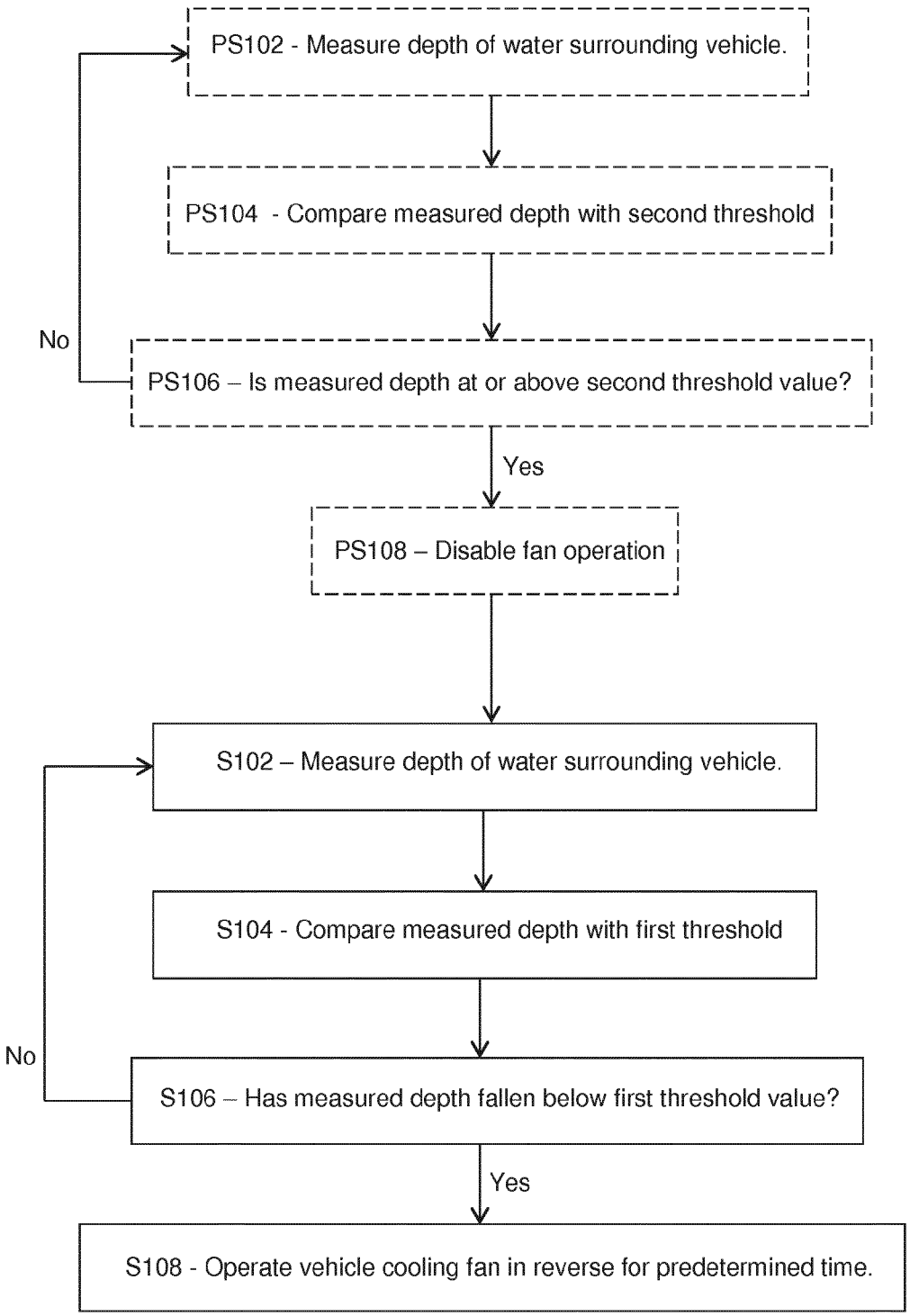
FIG. 3 shows a first flow chart illustrating the method of the invention.

A control system, vehicle and method in accordance with an embodiment of the present invention is described herein with reference to the accompanying FIGS. 1 to 3.

Referring to FIG. 1 a land vehicle 2, i.e. an automobile, is shown. The vehicle 2 may be a road vehicle or may be adapted for both on road and off road use. In the image shown the vehicle is adapted for both on road and of road use and is capable of wading through water 10 at a level up to a maximum wading threshold $W_{Max}$ which will be limited by the vehicle design, in this case by the level of engine air intakes 4 which should not be submerged to avoid air being drawn into the engine 6.

The vehicle is cooled by a circulating water cooling system as is well known in the art. The cooling water circulates through a heat exchanger in the form of a radiator 8 having a plurality of cooling fins 14. In use, as the vehicle moves, air enters through the front grill 12 of the vehicle and passes over the radiator cooling the water passing therethrough.

The vehicle is also provided with a cooling fan 16 that is operable to draw air through the front grill and over the radiator when operated in a first direction of rotation, referred herein as a forward direction. Although shown and described as a single fan it will be appreciated that the vehicle may be provided with a plurality of fans adjacent one another, and that where used herein the term "fan" refers to a fan unit that may comprise one or more fans for the purpose of creating an airflow over the radiator 8. The fan 16 may be continuously operable, or may only operate when air flow over the radiator 8 due to vehicle movement is insufficient to provide the required level of cooling to maintain the engine 6 temperature within an acceptable range. A cooling controller 18 is provided that controls the operation of the fan 16 to manage the engine temperature.

The vehicle may optionally be provided with a plurality of closable vanes 12a between the grill 12 and the radiator. The vanes 12a can be opened to allow air to pass over the radiator or can be closed to prevent air passing therethrough. When cooling is not required the vanes 12a can be closed so as to prevent airflow into the engine compartment. This may be beneficial to improve aerodynamic performance of the vehicle under these conditions. The vanes 12a may further be closed when the vehicle is wading to help prevent or at least reduce water ingress into the engine compartment. While wading the engine temperature will generally be cooled by virtue of the submersion of the vehicle in water and accordingly on emerging from a wading condition, under normal circumstances the vanes 12a may not be immediately opened, and may remain closed until a required engine temperature has been reached.

As discussed hereinabove, when the wading level is such that water 10 passes through the grill 12 into the radiator, impurities may be carried with that water into the radiator 8 and may become lodged therein, at the forward face thereof. When the vehicle 2 emerges from water the cooling water passing through the radiator 8 will quickly heat the radiator which will cause any debris to dry thereon. Furthermore, if when emerging form the water, remnants of water carting silt, sand or the like, may remain between the fins 14 of the radiator 8. As the radiator 8 heats up the water will evaporate leaving a coating of contaminants thereon. The build-up of these contaminants, over time, may reduce the cooling efficiency of the radiator to a level that prevents adequate cooling, resulting in the engine 6 overheating.

In the present invention, when the controller 18 receives a signal indicative that at least the front of the vehicle 2 is no longer substantially submerged in water, i.e. the water has fallen to a level at which it is below the level of the fan 16, the vehicle control system operates the cooling fan 16 in a reverse direction. The control of the fan 16 in reverse is effected by the cooling controller 18. It will be appreciated that the term "reverse" as used herein indicates that the fan 16 is operated in a direction opposite to the direction it would normally be operated in to draw air through the front grill 12 of the vehicle. If closable vanes 2a are provided, the controller 18 will open the vanes 12a so that air may be expelled by the fans 16 from the engine area through the radiator 8 and out the through the open vanes 12a and grill 12.

In such an embodiment, the controller may comprise any suitable ECU, and may include any variety of electronic processing devices, memory devices, input/output (I/O) devices, and/or other known components, and perform various control and/or communication related functions. In an embodiment, each controller may include an electronic memory device that may store various information, sensor readings (e.g., such as those generated by vehicle sensors 14), look-up tables, profiles, or other data structures (e.g., such as those used in the performance of the method described below), algorithms (e.g., the algorithms embodied in the method described below), etc. The memory device may comprise a carrier medium carrying a computer-readable code for controlling one or more components of vehicle 10 to carry out the method(s) described below. Each controller may also include one or more electronic processing devices (e.g., a microprocessor, a microcontroller, an application specific integrated circuit (ASIC), etc.) that executes instructions for software, firmware, programs, algorithms, scripts, applications, etc. that are stored in the corresponding memory device and may govern the methods described herein. Each controller may also be electronically connected to other vehicle devices, modules, subsystems, and components (e.g., sensors) via suitable vehicle communications and can interact with them when or as required.

For purposes of this disclosure, and notwithstanding the above, it is to be understood that the controller(s) or ECU(s) described herein may each comprise a control unit or computational device having one or more electronic processors. Vehicle 2 may comprise a single control unit or electronic controller for performing the functions described herein or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

The signal indicative that at least the front of the vehicle is no longer substantially submerged in water may be created manually by a driver using a button 20 forming part of an HMI. In this arrangement the driver by visual verification, determines whether the water level has reduced sufficiently and upon doing so can activate the reverse operation of the fan 16 by pressing of the button 20. The button 20 may be a physical hardware button, or alternatively it may be provided as an electronic button on a touch screen interface.

In another arrangement the water level may be automatically detected by sensors 24 on the vehicle 2. In this arrangement the signal indicative that at least the front of the vehicle is no longer substantially submerged in water may indicate that the water level relative to the vehicle has fallen below a first threshold value. The provision of vehicle mounted sensors for determining water depth is known; for example, in WO 2012/123555 a vehicle having a system comprising two ultrasonic transducer sensors, disposed on the left-side and right-side mirrors of the vehicle, operable in conjunction with an under-body mounted contact water sensor, is disclosed for detecting when a vehicle is wading and what the water depth is. The sensors 24, which may be provided on either side mirror of the vehicle, may comprises remote sensing sensors as described WO 2012/123555. A wading control module 26 interfaces with the sensors 24 and detects the depth of the water. The vehicle control system then determines if the water depth rises above a second threshold value (which may be the same as the first threshold value) at which second threshold value the water is of a depth wherein it may start to compromise operation of the fans, and disables fan control, or stops the fans operating when the second threshold is exceeded. The control system then continues to monitor the water depth and when it is detected that the water level falls below the first threshold value, the control system operates the fan in a reverse direction. The vehicle control system may be configured to work in one of two ways. Firstly the wade controller may calculate the depth of the water, compare the calculated water depth to stored first and second threshold values, and output signals indicative of whether the water has risen above the first threshold value or fallen below the second threshold value. The cooling controller 18 controls then controls the fan 16 in dependence thereon. Secondly, the wade controller 26 may calculate the water depth and output a signal indicative of the calculated water depth to the cooling controller 18, and the cooling controller 18 compares calculated depth to stored first and second threshold values, and controls the fan 16 in dependence thereon. As will be appreciated the cooling controller 18 and the wade controller 26 may each have a memory means 28, for example a solid state memory cache or RAM (Random access memory), associated therewith for storing the threshold values.

When calculating the water depth the wade controller 26 may calculate the water depth below the sensors 24, or optionally may manipulate the measured signals using look up tables, an algorithm, or a combination of both, to estimate the depth of water at the front of the vehicle, for example by measuring the vehicles attitude using a sensor cluster 30. Suitable methods for effecting such a calculation are described in the applicants co-pending application WO 2013/120970, the contents of which are incorporated herein by reference.

When the cooling controller 18 initiates control of the fan 16 in a reverse direction it operates the cooling fan 16 in reverse for a predetermined period of time, after which the cooling controller 18 may operate in a forward direction or may turn the fan off, for example if additional air flow is not needed to meet the cooling requirements of the engine 6 at that time. By operating in reverse for a predetermined period a balance between cleaning the radiator and effective cooling can be reached. When the fan is running in reverse it is likely that the cooling effect of the radiator will be reduced, hence it may be beneficial to limit the time period in which the fan is run in reverse so as to have an effective cleaning of the radiator without compromising engine temperature. The reverse operation could, for example, be in the region of 5 to 60 seconds which should be sufficient time to blow and contaminants/debris form the radiator, but not long enough for any temporary reduced cooling effect to have a negative effect on overall engine temperature.

It will be appreciated that modern vehicles are provided with a vehicle local area network (LAN) via which the various electronic modules, controllers, sensors etc., can communicate bi-directionally with various other electronic modules, controllers, sensors etc., in accordance with a suitable communications protocol such as the CAN (controller area network) protocol which is well known in the art.

It will be appreciated that motor driven fans have a peak efficiency speed, normally associated to a specific application of power, i.e. voltage and current, at which their efficiency is at a maximum. This will usually be the power rating that the manufacturer recommends the fan be run at. However, as the fan blades will be designed to effect maximum airflow when being driven in their normal mode of operation, i.e. in a forward direction, when operated in reverse a lower airflow will result. For this reason it may be beneficial to temporarily operate the fan 16 in reverse, at a speed above its peak efficiency. As such operation is relatively infrequent (i.e. only when emerging from a wading event, and has a short duration, operating above peak efficiency under such conditions is unlikely to have any long term negative effects on the motor of the fan 16, and will beneficially create an increased airflow to clean the radiator.

In one arrangement the vehicle control system may be configured to determine when the vehicle 2 is in, or is about to enter into, water 10 at a second threshold depth at which cooling fan 16 operation is affected by said water, and to suspend cooling fan operation in response thereto. Comparison of the actual measured water level and comparison to the second threshold will be effected in the same way as described herein above in relation to the first threshold. The first threshold and the second threshold may be the same, alternatively they may be different, for example the second threshold may be more or less than the first threshold.

A method of the invention is now described with reference to FIG. 3. The method has a number of steps S102 to S108 and also a number of optional steps PS102 to PS108. Starting at PS102 the vehicle on board sensors measure the water depth about the vehicle, and at step PS104 a comparison of the measured water depth values to the second threshold is undertaken.

At step PS106 the control system determines if the measured depth equals or exceeds the second threshold. If so the method progresses to step PS108, if not then the method loops to PS102. The control loop will be repeated at a predetermined frequency dependent upon operating parameters of the controller.

At step PS108 the controller operates disables the fan. This prevents fan operation during wading. In some cases this step may be omitted. It may be un necessary to disable the fans in systems when the fan only operates when required, as when water is in contact with the exterior of the fan this may be sufficient cooling to negate the control systems activation if the fan when wading. The process then carries on to step S102

At S102 the control system measures the depth of the water at or about the vehicle as described above, and the method progresses to step S104.

At S104 the control system compares the measured depth of water to a first threshold and at S106 the method determines whether the water level has fallen below the first threshold, which is indicative that the vehicle has emerged from the water to a degree sufficient that the fan 16 may be safely operated. If not the method loops to stem S102 and repeats the loop of measurement and comparison at a predetermined loop rate. Once the water level has fallen below the first threshold, indicative that the vehicle is no longer wading, the method then progresses to step S108.

At step S108 the cooling fan 16 is operated in reverse for a predetermined time period, for example for 30 seconds to clean the radiator 8. The sequence may be manually ended by an operator, or alternatively the method may loop back to step PS102 and continue to monitor if the vehicle re-enters a wading condition in which fan suspension is needed.

It will be appreciated that various changes and modifications can be made to the present invention without departing from the scope of the present application. Further aspects of the present invention will now be set out in the accompanying numbered paragraphs:

1. A vehicle control system for a land vehicle, the system comprising
   an electronic processor having an electrical input for receiving one or more electrical signals indicative that at least the front of the vehicle is no longer substantially submerged in water; and
   an electronic memory device electrically coupled to the electronic processor and having instructions stored therein,
   wherein the processor is configured to access the memory device and execute the instructions stored therein such that it is operable to, in response to said signal indicating that at least the front of the vehicle is no longer substantially submerged in water, operate a vehicle cooling fan in a reverse direction.

2. A vehicle control system according to paragraph 1 wherein the signal indicative that at least the front of the vehicle is no longer substantially submerged in water comprises a signal indicative that a water level relative to the vehicle has fallen below a first threshold value.

3. A vehicle control system according paragraph 1 further comprising a driver actuable input device for creating a signal indicative that least the front of the vehicle is no longer substantially submerged in water.

4. A vehicle control system according to paragraph 2 further comprising at least one sensor configured and positioned to sense a water level about the vehicle, and to output said signal indicative that at least the front of the vehicle is no longer substantially submerged in water in response to said sensed water level falling below a threshold value.

5. A vehicle control system according to paragraph 4 wherein said sensing system comprises a water level sensor and a wading controller module, and wherein the wading control module determines if the sensed water level falls below said first threshold value, and in response thereto creates said electrical signal indicative that at least the front of the vehicle is no longer substantially submerged in water.

6. A vehicle control system according to paragraph 4 wherein said processor comprises a vehicle controller and wherein said sensing system comprises a water level sensor and a wading control module, wherein the wading control module is configured to determine the depth of water about the vehicle and output a signal indicative of said depth, and wherein said vehicle controller compares said determined depth of water to said first threshold depth and controls said fan in dependence upon said comparison.

7. A vehicle control system according to paragraph 4 wherein said sensing system is configured to determine a water level at the front of said vehicle.

8. A vehicle control system according to paragraph 1 wherein the processor is configured to access the memory device and execute the instructions stored therein such that it is operable to, in response to receipt of said signal that at least the front of the vehicle is no longer substantially submerged in water, operate said cooling fan in reverse for a predetermined period of time.

9. A vehicle control system according to paragraph 8 wherein the processor is configured to access the memory device and execute the instructions stored therein such that it is operable to, following said predetermined period of time, operate said fan in a forward direction.

10. A vehicle control system according to paragraph 1 wherein operating said fan in a reverse direction comprises controlling the fan to operate at a speed above its peak efficiency speed.

11. A vehicle control system according to paragraph 1 wherein the processor is configured to access the memory device and execute the instructions stored therein such that it is operable, in response to an electrical signal indicative that the vehicle is in, or is about to enter into, water at a second threshold depth at which cooling fan operation is effected by said water, and to suspend cooling fan operation in response thereto.

12. A vehicle control system according to paragraph 1 for operating a vehicle having closable vanes for closing an airflow path between a front air inlet of the vehicle and an engine compartment thereof, wherein the processor is configured to access the memory device and execute the instructions stored therein such that it is operable to open said closable vanes when said fan is run in reverse.

13. A vehicle comprising a vehicle control system according to paragraph 1.

14. A vehicle according to paragraph 13 further comprising a radiator disposed substantially at a front end thereof, an engine disposed inwardly of said radiator, and a fan disposed between said engine and said radiator, wherein said fan is oriented such that it is operable in a forward direction to draw air over said radiator towards said engine and in a reverse direction to expel air away from said engine through said radiator.

15. A vehicle according to paragraph 13 further comprising one or more closable vanes located between a vehicle front grill and the radiator, the closable vanes movable between an open condition in which a flow path is open between the front grill and the radiator, and a closed position in which the flow path between the grill and the radiator is substantially closed, and wherein the control system is configured to open said closable vanes when said fan is run in reverse 16. A vehicle according to paragraph 13 further comprising at least one water level sensor mounted thereon.

17. A method of controlling a cooling fan of a land vehicle, the method comprising: in response to a signal indicative that at least the front of the vehicle is no longer substantially submerged in water, operating a vehicle cooling fan in a reverse direction.

18. The method according to paragraph 17 further comprising one of: providing a driver actuable input means for creating a signal indicative that at least the front of the vehicle is no longer substantially submerged in water; and sensing a water level about the vehicle and outputting said signal indicative that at least the front of the vehicle is no longer substantially submerged in water in response to said sensed water level falling below a threshold value.

19. The method according to paragraph 18 further comprising, in response to receipt of said signal that at least the front of the vehicle is no longer substantially submerged in water, operating said cooling fan in reverse for a predetermined period of time at a speed above its peak efficiency speed.

20. An electronic controller for a vehicle having a plurality of wheels and a cooling fan, the controller having a storage medium associated therewith storing instructions that when executed by the controller causes the control of the cooling fan of the vehicle in accordance with the method of: in response to a signal indicative that at least the front of the vehicle is no longer substantially submerged in water, operating a vehicle cooling fan in a reverse direction.

The invention claimed is:

1. A vehicle control system for a land vehicle, the system comprising:
   means for generating a first signal indicative of a condition wherein at least a front of the vehicle is substantially submerged in or about to enter water;
   an electronic processor configured, in response to the first signal, to suspend operation of a vehicle cooling fan; and
   means for generating a second signal indicative that the condition no longer exists,
   wherein the electronic processor is configured, in response to the second signal, to operate the vehicle cooling fan in a reverse direction, and
   wherein operating said vehicle cooling fan in a reverse direction comprises controlling the fan to operate at a speed above a peak efficiency speed.

2. A vehicle control system according to claim 1, wherein the second signal comprises a signal indicative that a water level relative to the vehicle has fallen below a first threshold value.

3. A vehicle control system according to claim 1, wherein the means for generating the second signal comprises a driver actuable input.

4. A vehicle control system according to claim 1, wherein the means for generating the second signal comprises a sensor for sensing a water level about the vehicle and outputting the second signal in response to said sensed water level falling below a threshold value.

5. A vehicle control system according to claim 4, wherein said sensor comprises a water level sensor and a wading control module, and wherein the wading control module determines if the sensed water level falls below said threshold value, and in response thereto generates said second signal.

6. A vehicle control system according to claim 4, wherein said sensor comprises a water level sensor and a wading control module, wherein the wading control module is configured to determine a depth of water about the vehicle and output a signal indicative of said depth, and wherein said electronic processor compares said depth of water to said first threshold depth and controls said fan in dependence upon said comparison.

7. A vehicle control system according to claim 4, wherein said sensor is configured to determine a water level at the front of said vehicle.

8. A vehicle control system according to claim 1, wherein the electronic processor is configured to, in response to receipt of said second signal operate said vehicle cooling fan in the reverse direction for a predetermined period of time.

9. A vehicle control system according to claim 8, wherein the electronic processor is configured to operate said vehicle cooling fan in a forward direction, following said predetermined period of time.

10. A vehicle control system according to claim 1, wherein the means for generating the first signal is configured to determine when the vehicle is in, or is about to enter into, water at a threshold depth at which cooling fan operation is affected by said water.

11. A vehicle comprising a vehicle control system according to claim 1.

12. A vehicle according to claim 11, comprising a radiator disposed substantially at a front end of the vehicle, an engine disposed near said radiator, and wherein the vehicle cooling fan is disposed between said engine and said radiator, wherein said vehicle cooling fan is oriented such that it is operable in a forward direction to draw air over said radiator towards said engine and in the reverse direction to expel air away from said engine through said radiator.

13. A vehicle according to claim 12, comprising one or more closable vanes located between a vehicle front grill and the radiator, the closable vanes being movable between an open condition in which a flow path is open between the front grill and the radiator, and a closed position in which the flow path between the front grill and the radiator is substantially closed, and wherein the electronic processor is configured to open said closable vanes when said vehicle cooling fan operates in the reverse direction.

14. A vehicle according to claim 11, wherein the means for generating the first signal comprises at least one water level sensor mounted on the vehicle.

15. A vehicle control system for a land vehicle, the system comprising:
   means for generating a first signal indicative of a condition wherein at least a front of the vehicle is substantially submerged in or about to enter water;
   an electronic processor configured, in response to the first signal, to suspend operation of a vehicle cooling fan;
   means for generating a second signal indicative that the condition no longer exists, wherein the electronic processor is configured, in response to the second signal, to operate the vehicle cooling fan in a reverse direction; and
   closable vanes for closing an airflow path between a front air inlet of the vehicle and an engine compartment, the electronic processor being configured to open said closable vanes when said vehicle cooling fan operates in the reverse direction.

* * * * *